Feb. 4, 1969 G. O. BUCKNER 3,426,303
DEPTH ENCODER USING MAGNETIC ROTATIONAL CONVERSION
Filed Sept. 6, 1966

INVENTOR.
GUY O. BUCKNER
BY William E. Johnson Jr.

United States Patent Office 3,426,303
Patented Feb. 4, 1969

3,426,303
DEPTH ENCODER USING MAGNETIC ROTATIONAL CONVERSION
Guy O. Buckner, Houston, Tex., assignor to Dresser Industries, Inc., Dallas, Tex., a corporation of Delaware
Filed Sept. 6, 1966, Ser. No. 577,345
U.S. Cl. 335—206        5 Claims
Int. Cl. H01h 9/16

ABSTRACT OF THE DISCLOSURE

A first drum having ten magnets is mounted on a rotatable shaft. A second drum having a pair of magnets is connected through a slip clutch to the shaft, a pair of stops allowing the second drum limited rotation in either direction. A first reed switch, being responsive to the magnets on the first drum, provides an electrical signal indicative of the amount of shaft rotation. A second reed switch, being responsive to the magnets on the second drum, provides an electrical signal indicative of the direction of shaft rotation.

---

This invention relates to an apparatus for converting the mechanical rotation of a depth measuring device into an electrical signal. In particular the invention relates to an apparatus for monitoring the depth of a geophysical bore hole and for converting the information obtained therefrom into electrical signals to be recorded on a magnetic computer tape.

The purpose of well logging is to identify the composition of the formations of the earth surrounding a well. In particular, oil or oil-bearing formations are sought to be identified.

Numerous logging methods have been advanced by the workers in the art for locating valuable substances in the subsurface formations of the earth, including electrical methods which involve the measurement of self potential, conductivity, and resistivity; thermal methods; seismic methods which treat of the acoustical properties of the subsurface formations; natural radioactivity of the formations; and those methods in which the formations are irradiated with radioactive radiations and an effect such as the gamma radiation produced by the neutron interactions in the formations measured. While these methods are different in their individual approach towards the determination of the existence of oil-bearing formations, they do share a common parameter, that of the depth of the measurement.

The depth for well logging is generally measured by the rotation of a measuring sheave, i.e., a wheel of known circumference over which a wire-line from the logging truck to the downhole tool is run. The rotation of the sheave has either mechanical means, or electrical means, for example, a selsyn coupled to a mechanical counter to indicate depth. In such prior art systems, a recording film and a number projection system is driven by the rotation of the sheave to record a given amount of film per unit depth of bore hole and record depth numbers on this film.

With the advent of recording well logging data on magnetic computer tape which is compatible with electronic computers, there has arisen a need for an electrical depth register to provide a direct recording of the depth on the magnetic computer tape.

It is therefore an object of the invention to provide a depth encoder apparatus for converting the mechanical rotation of a measuring sheave into a signal for an electrical depth register.

It is another object of the invention to provide means within the depth encoder to indicate whether a downhole tool is moving up or down.

The objects of the invention are accomplished, broadly, by an apparatus having reed switches, magnets and slip clutches therein, the small horseshoe magnets being oriented to rotate under a reed switch in such a manner to close the switch and provide an indication of depth. The magnets are mounted on a mark drum on the input shaft of the apparatus, one revolution of the shaft providing ten closures of ten magnets, respectively. There are two direction switches positioned about twenty degrees apart in the body of the depth encoder mounted on a direction drum riding on the input shaft by means of a slip clutch. A clutch stop limits the rotation of the direction drum to about twenty degrees. When the input shaft rotates about twenty degrees or more the direction drum rotates against the stop such that one and only one of the direction switches is closed. Additional rotation of the input shaft holds the direction drum in position with torque through the slip clutch. Any additional rotation also rotates the mark drum to give one switch closure per unit of depth on the proper line.

The ten magnets on the mark drum are mounted with alternating polarity so that midway between the magnets, the flux reverses and is, therefore, zero. On the direction drum, three magnets are used to provide zero flux approximately twenty degrees either side of the center magnet to insure that when the direction drum is rotated against the stop, one direction switch is closed and the other is open.

These and other objects, features, and advantages of the present invention will be apparent from the following detailed description, taken with reference to the figures of the accompanying drawings, wherein the same or similar reference characters illustrate the same or similar parts:

Figure 1:
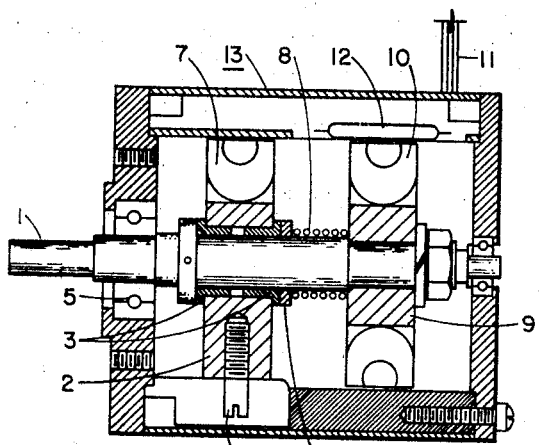
FIGURE 1 is a pictorial view in section of the depth encoder apparatus according to the invention.

In the form of the present invention chosen for purposes of illustration in the dawings, FIGURE 1 shows a pictorial view in section of the depth encoder apparatus according to the invention. An input shaft member 1, which would normally either be directly coupled or through a gearing system to a measuring sheave (not illustrated) is connected through a conventional roller bearing assembly 5 to the encoder housing 13. A direction drum 2 rides on the input shaft member 1 by means of a conventional slip clutch 3, the slip clutch having on one end thereof a hard steel thrust washer 4. A spring member 8 maintains the desired tension on the thrust washer 4 and the slip clutch 3. Mounted on the direction drum 2 are three magnets, only one of which is illustrated in FIGURE 1, having the number 7 attached thereto.

Figure 2:
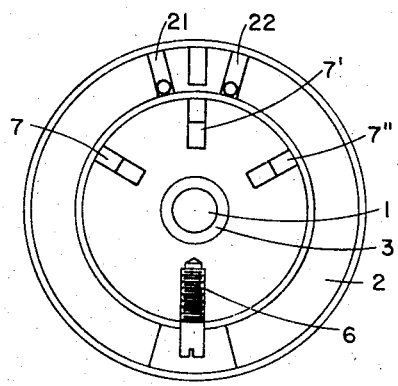
FIGURE 2 is a sectional view of the direction drum of FIGURE 1.

As is seen in FIGURE 2 the three magnets, for example, horeshoe magnets and labeled as magnet 7, 7', and 7'', are positioned approximately twenty degrees apart, the purpose of which will be explained hereinafter.

Referring back to FIGURE 1, a clutch stop member 6 is positioned in the housing 13 to provide stop means whenever the direction drum 2 turns in either direction at an angle of about twenty degrees. There is a mark drum 9 mounted directly to the input shaft member 1 so that the drum 9 turns when the input shaft member 1 turns. Mounted on the mark drum 9 are ten magnets, only two of which are illustrated and only one of which is labeled with a numeral 10. The ten magnets are spaced equidistant around the drum 9. However, the number of magnets is merely exemplary of the invention and it should be appreciated that a larger or smaller number of magnets could be arranged on the drum member 9 if so desired.

A reed relay 12 is mounted in the housing 13 and connected such that the relay closes each time one of the magnets 10 passes by the relay 12. The ten magnets in the mark drum 9 are mounted with alternating polarity so that midway between the magnets, the flux reverses and is therefore zero. Thus it should be appreciated that as the input shaft 1 makes one complete revolution, the mark drum 9 makes one complete revolution, causing the ten magnets to thus cause a closure of the reed relay 12 ten times. As will be explained hereinafter the closure of the reed relays is a direct indication of depth.

Referring now to FIGURE 2, the three magnets 7, 7', and 7" are spaced approximately twenty degrees apart. As the direction drum 2 rotates by means of the slip clutch 3 upon the input shaft member 1 the drum 2 moves approximately twenty degrees before being caused to stop by the clutch stop member 6. Since the three magnets are arranged such that the magnet 7 and the magnet 7" are approximately twenty degrees on their respective side of the center magnet 7', there is a zero flux situation set up approximately twenty degrees either side of the center magnet, thus insuring that when the direction drum is rotated against the stop member 6, one direction switch 21 is closed and the other direction switch 22 is open.

Although not illustrated in FIGURE 1, the reed relay switches 21 and 22, being like the reed relay 12 of FIGURE 1, are positioned within the housing to provide a closure of one or the other of the switches when the drum 2 has rotated around to the stop member 6. Thus it should be appreciated that when the downhole tool (not illustrated) is moving in one direction, for example, down, the input shaft member 1 will be rotating one direction, while a reversal of the downhole movement, for example, up, will cause the input shaft member 1 to rotate in the other direction, thus causing the drum member 2 to come against the stop member 6 in the other direction.

Figure 3:
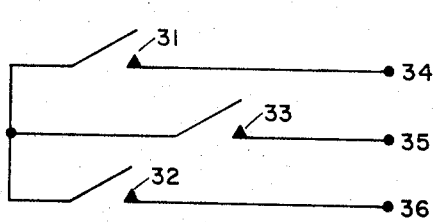
FIGURE 3 is a schematic representation of the electrical circuit of the depth encoder.

Referring now to FIGURE 3, there is illustrated a simple schematic wiring diagram which is indicative of the operation of the apparatus embodied within FIGURE 1. Since switch 31 is connected to reed relay 21 of FIGURE 2 and switch 32 is connected to reed relay 22 of FIGURE 2, it should be apparent that switch 31 will close when the downhole tool is operating in one direction and switch 32 will close when the downhole tool is operating in an opposite direction. Switch 33 is connected to reed relay 12 of FIGURE 1 such that each time the switch 33 closes, being equivalent to $\frac{1}{10}$ of the rotation of the input shaft member 1, there will be an electrical circuit closure indicative of the depth.

The output connections 34, 35, and 36, coming out of the cable 11 in FIGURE 1, can be connected to numerous electrical circuits to provide an electrical indication of a depth measurement, such as the decimal digit registers well-known in the art. Since there are many such conventional circuits known to the art, none will be described at length herein. Suffice it to say that the closure of switch 31 and the repetitious closure of switch 33 causes terminal 34 to be repetitiously closed to terminal 35, while the closure of switch 32 and the repetitious closure of switch 33 causes terminal 35 to be repetitiously closed to terminal 36. Thus, for example, the closure of terminal 34 to terminal 35 could trigger a conventional monostable multivibrator to provide a digital pulse indicative of depth, and the closure of terminal 35 to terminal 36 could provide a similar indication in an opposite direction.

While there are numerous circuits for operating upon the terminals 34, 35, and 36 which are well-known in the art, a circuit which finds particular utility with the apparatus according to the present invention is described in the patent application, Ser. No. 594,744, filed Nov. 16, 1966, and assigned to the assignee of the present invention.

It should therefore be apparent that the apparatus as embodied within FIGURE 1, and as illustrated in a simplified electrical diagram in FIGURE 3, there has been illustrated and described an apparatus which converts the mechanical movement of an input shaft member into electrical signals which are indicative of the depth of a bore hole in addition to providing an indication of whether the downhole tool is moving up or down.

While there have been illustrated three magnets on the direction drum member 2, each of which is spaced at approximately twenty degrees, it should be appreciated that the number of magnets thereon, as well as the spacing, is merely exemplary of the embodiments which may be used with the invention and it is recognized that a lesser or greater number of magnets, either with or without different geometrical locations on the drum 2 will be readily apparent to one skilled in the art after a reading of the specification and drawings herein.

Although not illustrated, it should be appreciated that another embodiment would include by the appropriate spacings an apparatus wherein a separate magnet could be used to activate each of the switches 21 and 22 from the rotation of the direction drum.

Numerous other modifications and variations of the present invention may be made without departure from the scope and essence of the functions hereinbefore described. Accordingly, it should be clearly understood that these forms of the invention depicted in the figures of the accompanying drawings, and described herein, are illustrative only and are not intended to limit the scope of the present invention.

What is claimed is:
1. An apparatus for converting mechanical rotation into electrical signals comprising:
 (a) an input shaft member;
 (b) a first drum having at least one magnet mounted thereon, said first drum being directly mounted to said input shaft member;
 (c) first electrical means responsive to said at least one magnet, whereby said at least one magnet causes a switch closure in said means when said at least one magnet on said first drum rotates past said electrical means;
 (d) a second drum connected through a slip clutch to said input shaft member, said second drum having at least one direction magnet mounted thereon;
 (e) a clutch stop member, whereby said second drum can only rotate a predetermined angle as the input shaft member rotates in either direction; and
 (f) a second and a third electrical means, each of which is responsive to said at least one direction magnet, whereby said at least one direction magnet causes a switch closure in said second electrical means when said second drum rotates in one direction and causes a switch closure in said third electrical means when said second drum rotates in a second direction.

2. An apparatus for converting mechanical rotation into electrical signals comprising:
 (a) an input shaft member;
 (b) a first drum having at least one magnet mounted thereon, said first drum being directly mounted to said input shaft member;
 (c) first electrical means responsive to said at least one magnet, whereby said at least one magnet causes a switch closure in said means when said at least one magnet on said first drum rotates past said electrical means;
 (d) a second drum connected through a slip clutch to said input shaft member, said second drum having a plurality of direction magnets mounted thereon;
 (e) a clutch stop member, whereby said second drum can only rotate a predetermined angle as the input shaft member rotates in either direction; and
 (f) a second and a third electrical means, said second means being responsive to one of the plurality of said direction magnets and said third means being responsive to another of the plurality of said direction magnets, whereby said one of the plurality of said direction magnets causes a switch closure in said second electrical means when said second drum rotates in one direction and said another of the plurality of said direction magnets causes a switch closure in said third electrical means when said second drum rotates in a second direction.

3. The apparatus according to claim 1 wherein said at least one magnet comprises a plurality of equispaced magnets mounted with alternating polarity, whereby the flux reverses midway between each of said magnets.

4. The apparatus according to claim 3 wherein said first, second and third electrical means each comprise a reed relay.

5. The apparatus according to claim 1 wherein said at least one direction magnet mounted on said second drum comprises a first, a second and a third magnet, said first and third magnets being positioned to respectively provide approximately zero flux under the third electrical means when said second electrical means is activated and to provide approximately zero flux under the second electrical means when said third electrical means is activated.

References Cited

UNITED STATES PATENTS

| | | | |
|---|---|---|---|
| 2,544,979 | 3/1951 | Brokaw et al. | 335—207 X |
| 3,133,173 | 5/1964 | Vriens | 335—153 X |
| 3,233,060 | 2/1966 | Wintriss | 335—153 |
| 3,264,639 | 8/1966 | Lerman et al. | 200—61.39 |

BERNARD A. GILHEANY, *Primary Examiner.*

R. N. ENVALL, JR., *Assistant Examiner.*

U.S. Cl. X.R.

335—207; 200—61.39